US007264384B1

(12) United States Patent
Ryan et al.

(10) Patent No.: US 7,264,384 B1
(45) Date of Patent: Sep. 4, 2007

(54) INTEGRAL VESSEL HARDTOP AND MARINE NAVIGATION LIGHTING SYSTEM

(75) Inventors: Peter Derek Ryan, Fort Lauderdale, FL (US); Edward Ray Hughes, Hollywood, FL (US); Javier Alejandro Carbi Haubold, Doral, FL (US)

(73) Assignee: Pipewelders, Inc., Fort Lauderdale, FL (US)

( * ) Notice: Subject to any disclaimer, the term of this patent is extended or adjusted under 35 U.S.C. 154(b) by 174 days.

(21) Appl. No.: 10/906,371

(22) Filed: Feb. 16, 2005

(51) Int. Cl.
*B60Q 1/00* (2006.01)

(52) U.S. Cl. ...................... 362/477; 362/543; 362/544; 362/545

(58) Field of Classification Search ................ 362/477, 362/470, 493, 495–496, 543–545, 487
See application file for complete search history.

(56) References Cited

U.S. PATENT DOCUMENTS 4,441,783 A * 4/1984 Houghton et al. .......... 385/146
2003/0147253 A1* 8/2003 Shy ............................ 362/545
2004/0062050 A1* 4/2004 Wolske ....................... 362/477

* cited by examiner

*Primary Examiner*—Renee Luebke
*Assistant Examiner*—Robert May
(74) *Attorney, Agent, or Firm*—Malin, Haley & DiMaggio, P.A.

(57) ABSTRACT

An integrated marine vessel hardtop and navigation lighting system, for use on boats having a hardtop or platform which covers the helm, bridge, cockpit or similar areas. The system includes a hardtop having recessed voids which receive specially designed starboard, port and stern integral lighting assemblies and LED matrix array modules. The lights provide improved chromaticity and luminosity in desired angular fields of light, and further having arcuate surfaces which complement port and starboard lenses having mating surfaces. The lighting system is secured and self contained and coterminous with the hardtop. The hardtop and lighting modules constitute a generally unitary and stealth assembly, the light fixtures being integrated within said hardtop means in an unobtrusive manner without protuberances.

8 Claims, 10 Drawing Sheets

INTEGRAL VESSEL HARDTOP AND MARINE NAVIGATION LIGHTING SYSTEM

FIELD OF THE INVENTION

The Present invention relates to an integral marine vessel hardtop and lighting system, and more particularly to modular light assembly for starboard, port and stern lights, which are seamlessly integrated into the conventional hardtops of boats and yachts. The novel navigation lighting system is unobtrusive, seamless and operationally superior to conventional boat lights and assemblies. The instant lighting system conforms to the Coast Guard regulations governing marine vessels, and has passed rigid test requirements for approval.

DESCRIPTION OF RELATED ART

The prior art discloses a variety of marine safety lights, navigation light assemblies and housing, fixtures of different configurations, as well as electronic means to control the operation, components and efficiency of the products. These disclosures address the requirements of the U.S. Coast Guard and the regulations concerning electric navigation lights. The mandatory requirements are referred to as Navigation Rules: International—Inland, and the International Regulations for the Prevention of Collisions at Sea (COLREGS). These federal regulations can also be found in the American Boat & Yacht Council (ABYC) Standards and Technical Reports.

These standards and the recommended practices govern the design, performance and installation of electric navigation lights for a variety of vessel lengths, and also depend on the water in which the crafts are operating.

In general, the Coast Guard requirements address the distance at which the starboard, port and sterns must be visible, the luminous intensity and chromaticity of the light, the arcs and fields of visibility, and the particular placement of the lights on or about the sailboat or motorboat. The ABYC materials set forth the particular requirements, for example, found at ABYC Standards and Technical Reports, A-16, Electric Navigation Lights, Sections 16.1 through 16.10 & Appendices.

Of critical importance is the vertical and horizontal sectors for the luminous intensity, colorimetrics and cut-off angles for the propagation and fields of light. In practice the regulations require that a specific navigation light, for example the starboard green, be visible at a particular angular range by another boat located three miles away. The controlling regulations require that the light assemblies or fixtures pass operational tests that measure the lights intensity and color at that distance, and at specific angles both vertically and horizontally, or at varying altitudes from sea level, and in different horizontal arcs from the light. Red or port side lights must only be visible in certain sectors, and cannot invade the areas dedicated for green or starboard lights. The same is true for the white stern lights.

Prior light designs also address the durability and integrity of the light fixtures to withstand the rigors of marine conditions. It is well know that metal, electronic and plastic, rubber or composite materials experience significant degradation and destruction because of corrosion that occurs in fresh and salt water environments. This condition is exacerbated by direct exposure to water, air and wind, as well as the deleterious effects of the sun and ultraviolet radiation. Therefore many of the prior designs attempt to solve these problems by incorporating water resistant and air tight housing, and also those that can withstand substantial impact or trauma forces which can be experienced from waves, other boats or equipment.

For example, U.S. Pat. No. 5,664,866 issued to Reniger et al., entitled Light Assembly, discloses a navigation light for marine craft, which includes a specially designed base that is mountable to the vessel deck. It discloses a hemispherical Fresnel prismatic lens sealingly attached to the base with an incandescent light bulb chamber. The '866 patent further includes a cap which secures the lens and base units. FIG. 1 is a side view of the light assembly, and FIG. 2*a* shows the device in cross-section. It can be seen that this type of light unit and housing constitute a large physical impediment, which protrudes awkwardly and substantially above the boat deck, side or wall about which it is mounted. It is susceptible to damage or encountering inadvertent collision or contact with docks, pilings, boaters, equipment, or other boating accessories. It also subjects boat occupants to potential physical injury by bodily contact with the light unit, as an obstacle which is incompatible with the immediately surrounding boat surfaces. The designs disclosed in the '866 patent are similar to numerous light assemblies used by current boat manufacturers, and are the type of devices the instant invention was meant to overcome.

U.S. Pat. No. 4,219,871 issued to Larrimore, entitled High Intensity Navigation Light, discloses a running light fixture designed to endure submersion to great depths, avoid reduction in light transmittance, and discloses novel heat sinks and collectors placed at the top and about the base of the device. This design suffers the same deficiencies as other lights which are not integrated into conventional boat components, and which jetty outwardly from surrounding deck or support members.

U.S. Pat. No. 6,637,915 issued to von Wolske, entitled Navigation Light System and Method, discloses an adjustable eyeball light fixture that serves as a navigation or accessory light to reduce glare to the operator, and can be mounted to an appurtenance, railing, pulpit or similar support member.

U.S. Pat. No. 5,416,670 issued to Authier, entitled Watercraft Navigation Light System, discloses a generally cylindrical and translucent housing which contains a chemiluminescent light source. This device is mountable about the vessel hull or deck, and projects outwardly at desired locations.

U.S. Pat. No. 6,086,220 issued to Lash et al., discloses a marine stern safety light which is mounted to a horizontal surface of the boat, and includes a vertical pedestal base which supports a Fresnel lens and encapsulated light source that is positioned a substantial distance above the surface of the boat. The light source is several LEDs mounted in a horizontal plane about a center point, and provides omni directional light about 360 degrees.

Other port, starboard and stern light designs include many different designs for mechanical housings, pedestal style bases, semi-oval and rounded lens/cap assemblies and light sources of varied components. These prior art designs all have in common, the deficiencies of secondary, undesired and dangerous physical obstacles which protrude from the vessel surfaces and cause damage or personal injury.

It is therefore appreciated that a marine navigation lighting system is needed which can be incorporated into a vessel hardtop, as an integral and flush component thereof, and which eliminates the problems associated with conventional boat lights, separate fixtures or housing which require mounting on the vessel walls, deck or hull, and which provide undesired and unnecessary obstacles endangering boat occupants.

The prior art discloses many navigation light designs, however the art has failed to address or solve the problems which the instant invention overcomes.

Accordingly, what is needed in the marine industry is an improved marine navigation lighting system which has stealth like features, is an integral and essentially inherent component of the vessel hardtop, forming a substantially unitary device with superior light sources. It is, therefore, to the effective resolution of the aforementioned problems and shortcomings of the prior art that the present invention is directed. However, in view of the navigation light design in the marine industry in existence at the time of the present invention, it was not obvious to those persons of ordinary skill in the pertinent art as to how the identified needs could be fulfilled in an advantageous manner.

BRIEF SUMMARY OF THE INVENTION

The present invention contemplates a new, improved and modified integral boat hardtop and integral navigation design. The improved design includes a seamless and streamlined integration into a boat's hardtop, constitutes an internal unit thereof with contiguous flush geometries, eliminating physical impediments. The novel system includes navigation lights and fixtures which are recessed in generally forward facing recesses within the hardtop itself, without altering the geometry of the hardtop. At the same time, the system provides for superior lighting characteristics that meet or surpass the certification regulations promulgated by the U.S. Coast Guard.

The invention also includes an improved LED light source that incorporates a unique matrix array providing for operationally efficient angular lighting, fields of vision, brightness and chromaticity.

The invention is essentially user friendly and extremely effecient in operation, such that boat captains or operators can utilize the system with ease and without concern as maintenance requirements, mechanical or electrical failure. The design is also an improvement which can be quickly incorporated into in can be readily incorporated into manufacturing techniques, and is also extremely cost effective.

In an alternative design, the invention includes different lens colors to provide the appropriate starboard, port and/or stern lights, utilizing common bright white LEDs.

Additionally, the design is structurally and functionally unobtrusive, such that it does not constitute a substantial physical obstruction or hindrance, nor an awkward assembly which protrudes from the vessel hull or deck, as do common boat lights. This is especially to be appreciated when recognizing the existing problems with conventional light housings. Boat operators or guests often hit, trip or stumble on conventional light fixtures when moving about the boat or decks. This is because the light units are mounted on the deck or hull as shown in the U.S. patents cited above, and provide obvious physical, mechanical and electrical obstacles. Further these same fixtures are often damaged in boating and docking maneuvers, when the dock line, docks or pilings strike the lights causing direct damage to the light fixture, boat or hull. The housing can be cracked causing leakage, and therefore corrosion and destruction of the electrical components and light source. The instant invention provides a clean and cleaver solution to the problems set forth above by constituting unit that is flush with the hardtop itself, unobtrusive, stealth-like and in a position elevated above the helm area for providing superior light and visibility qualities. Further, the LED light source itself is of a unique design providing for greatly improved light characteristics and performance.

In accordance with the instant invention, it is an object thereof to provide an improved marine navigation lighting system and assemblies, for use on marine vessels having helm, cockpit and/or bridge hardtops with structural support members therefore that eliminate the requirement of mounting separate light fixture upon the vessel hull or deck.

It is a further object of the instant invention to provide an improved integral marine navigation lighting system and hardtop, which includes a superior mechanical design, it is operationally efficient, and is easy to maintain.

It is a further object of the instant invention to provide an integral improved marine navigation lighting system and hardtop, which is seamlessly incorporated into the vessel hardtop, is easy to install and maintain, and provides stealth like features.

It is a further object of the instant invention to provide an improved integral marine navigation lighting system and hardtop, which is cost effective, operationally efficient and of a superior manufacturing design.

Still another object of the present invention is to provide an improved integral marine navigation lighting system and hardtop, which is compatible with existing boat hardtops, can be incorporated into original equipment, or alternatively retrofitted to existing boats.

A further object of the present invention is to provide an improved integral marine navigation lighting system and hardtop, which includes all of the above-mentioned features and objects to provide a substantially superior design, eliminating the problems encountered by prior devices, and generally solving problems associated with contemporary port, starboard and stern light fixtures.

These and other important objects, advantages, and features of this invention will become clear as this description proceeds hereinafter. The invention accordingly comprises the features of construction, engineering designs and components, the interrelationship thereto, combination of elements, and arrangement of parts that will be exemplified in the description set forth hereinafter.

In accordance with these and other objects which will become apparent hereinafter, the instant invention will now be described with particular reference to the accompanying drawings.

DETAILED DESCRIPTION OF PREFERRED EMBODIMENTS

Figure 1:
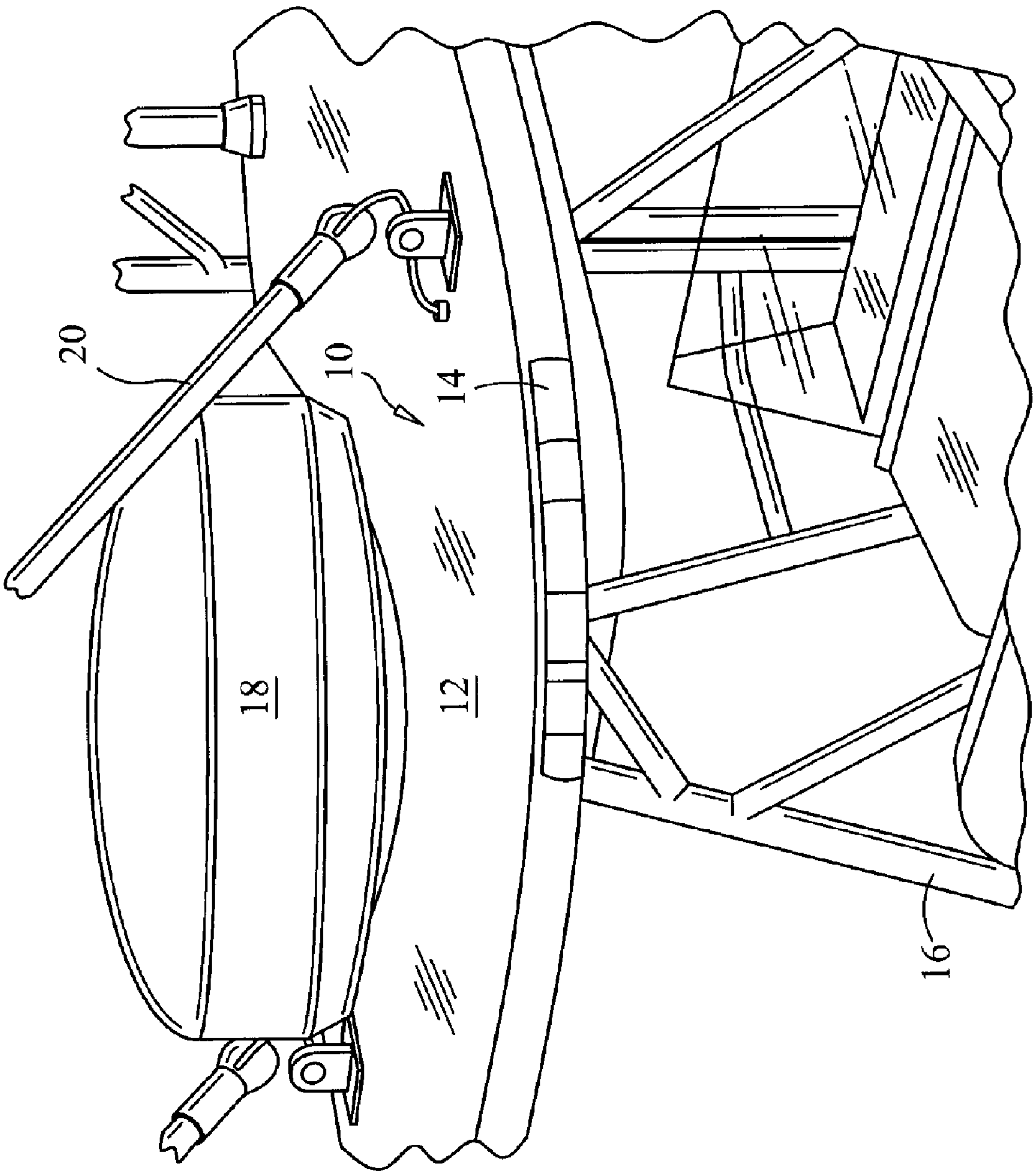
FIG. 1 is a perspective view of an improved integral marine navigation lighting system and hardtop, incorporating the instant invention.

Turning to FIG. 1, an embodiment of the invention 10 is shown in perspective, illustrating the vessel hardtop 12 and integral port light fixture 14. The otherwise conventional hardtop is secured by support tower or pipe members 16, and in this boat configure the hardtop is covering a center console cabinet. The hardtop is also shown supporting a radar unit 18 and antenna 20.

Figure 2:
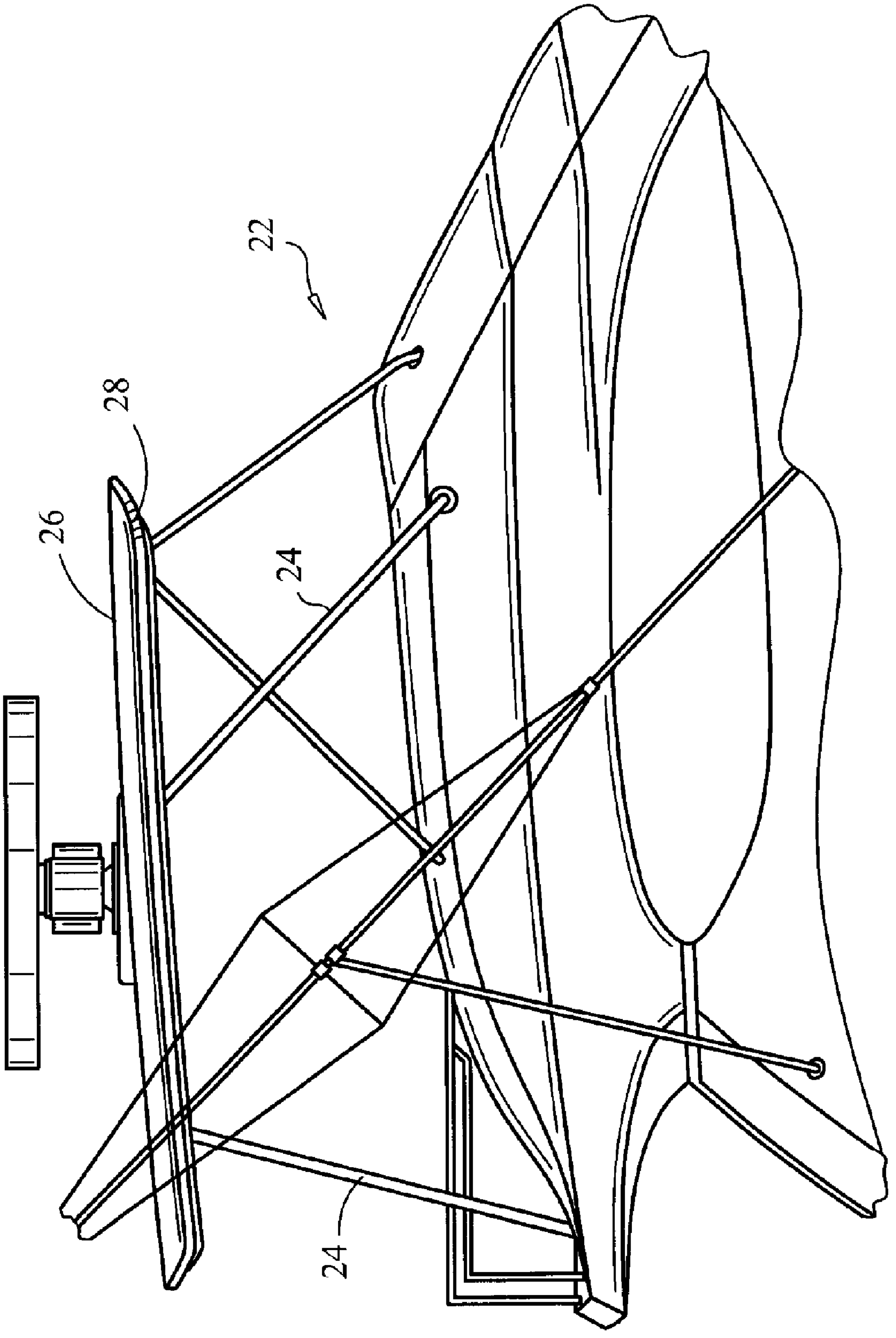
FIG. 2 is a side plan view of the invention illustrated in FIG. 1, illustrating in part the side of the vessel, helm area, and the integral navigation light system and hardtop.

FIG. 2 is a side plan view of a vessel bridge 22, and support arms 24. Hardtop 26 contains the integral navigation light modules, including starboard light 28. As depicted in FIGS. 1 & 2, the instant navigation light system comprises a conventional boat hardtop that contains the internally secured light modules in the top, without altering the typical geometry of thereof. The modules are mounted in an unobtrusive and stealth manner, flush with top, sides and bottom of the hardtop. The fixture and components are entirely hidden, with the exception of the lens. There are no physical components, no housings or pedestals, or no lenses which constitute a separate fixture and protrude outward, upward or from the vessel surfaces as do conventional lights.

Figure 3C:
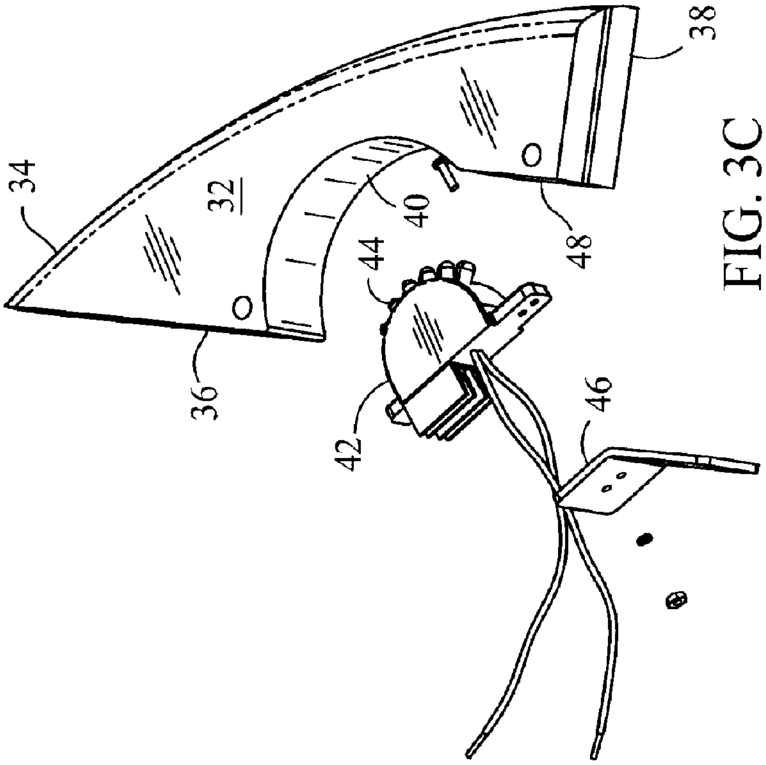
FIG. 3C is an exploded perspective of the apparatus shown in FIG. 3A, illustrating the components prior to assembly.
Figure 3A:
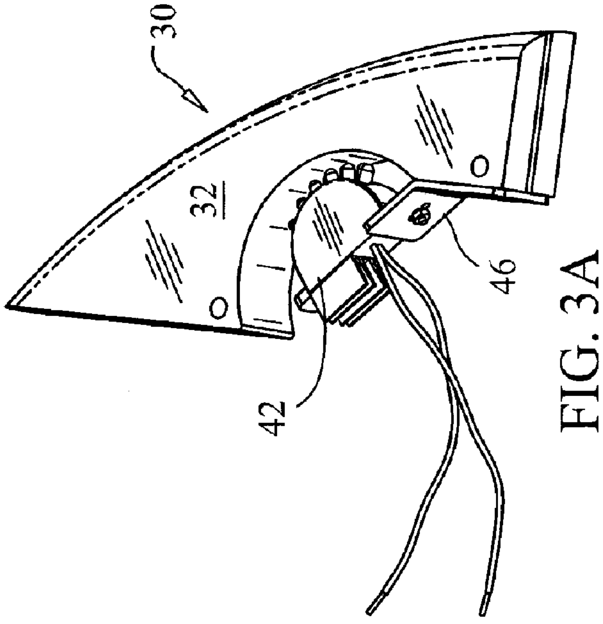
FIG. 3A is a perspective view of an embodiment of the starboard novel lens and LED module components of the instant invention.
Figure 3B:
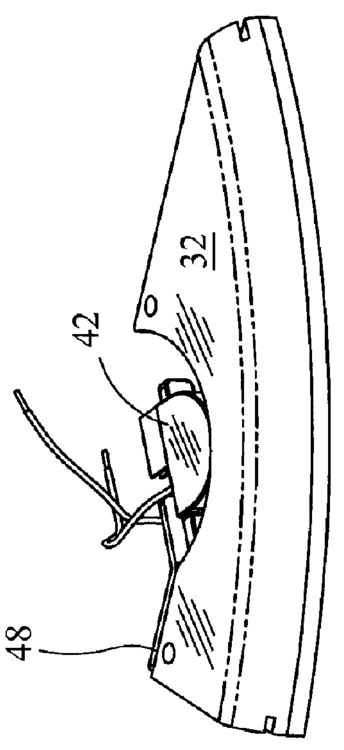
FIG. 3B is an alternative perspective view of the apparatus illustrated in FIG. 3A.

FIG. 3A illustrates a top perspective view of the starboard light assembly 30, and FIG. 3B illustrates a side perspective view thereof. FIG. 3C is an exploded perspective of the apparatus shown in FIGS. 3A and 3B, and illustrates the separate components prior to assembly.

Referring to FIG. 3C, modular starboard lens 32 is shown in one embodiment as having an irregular curved front surface 34, the front surface providing the transition from the front of the hardtop to the side of the hardtop, and further allows for the precise light sectors and fields of vision required for certification, as further described hereinafter. Lens 32 also is configured to have angular front edge 36 and angular side edge 38, which can be generally perpendicular to one another. Edges 36 and 38 abut the corresponding surfaces of the hardtop's front and side.

The geometric design of the lens front and side edges provides the cut-off masking which blocks the horizontal and vertical beam spread sectors of emitted light, to comply with the requirements for port and starboard lights. The successful test certification results relating thereto are further discussed below.

Lens 34 also has a curved back surface 40 of a geometry to accommodate and correspond to the general shape of the navigation light LED module assembly. In an alternative embodiment, back surface 40 is concave to constitute an arcuate void with the lens 34, and be of a complementary curvature to the LED module.

The lens 34 can be manufactured of an appropriate translucent material, relatively rigid and scratch resistant to withstand the rigors of marine conditions. A clear, plastic composite polycarbonate material has been found to be satisfactory, allowing for the substantially unimpeded transmission and propagation of light with de minimus attenuation or degradation in the characteristics of light. The lens 34 is shown as being asymmetrical, however as would be appreciated by one of ordinary skill in the art, different radiuses of curvature can readily be incorporated into the invention, in alternative designs, and provide adequate transition about the hardtop corners. It must be noted, however, the designs must maintain compliance with the Coast Guard standards for fields of vision, angular outputs and the like.

Also shown in FIGS. 3A through 3C is LED module assembly 42 having a plurality of LEDs 44 mounted thereto. A variety of securing means can be incorporated into the system to secure the LED module with the lens. In a preferred embodiment, bracket 46 secures the LED module 42 to a back surface 48 of lens 32, using any number of conventional fasteners such as bolts, nuts, screws, or rivets. Alternatively, appropriate adhesives or bonding materials can be utilized.

Figure 4:
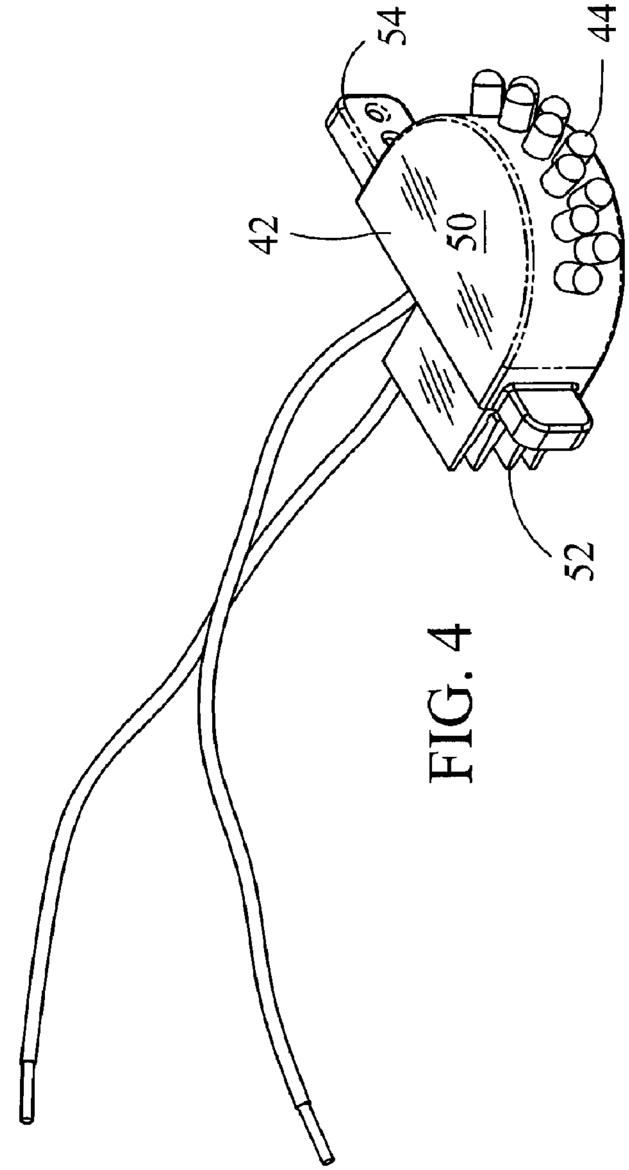
FIG. 4 is a perspective view of the LED module and matrix array.

FIG. 4 depicts the LED module 42, as well as the plurality of LEDs 44. The module, in a preferred embodiment, includes arcuate mounting block 50, which has a front radius of curvature to accommodate the curvature required for the LEDs and desired fields of light sectors, and to correspond to the back concave surface 40 of lens 32.

The block can be manufactured of any well known materials used to mount LEDs and electrical components, such as a cast resin, composite and/or plastic insulating material.

The mounting block 50 also can include a heat sink 52 secured to its back surface, for dissipation of thermal conditions to prolong the life of the device. Securing tabs or flange 54 are used to attach the block to a mounting bracket 46, as shown in FIGS. 3A through 3C.

FIG. 4 depicts that the LEDs can be mounted in a matrix array, generally in two horizontal rows. With respect the vertical relationship, LEDs are offset in alternating columns to provide a full, consistent and intense navigation light source.

Figure 5A:
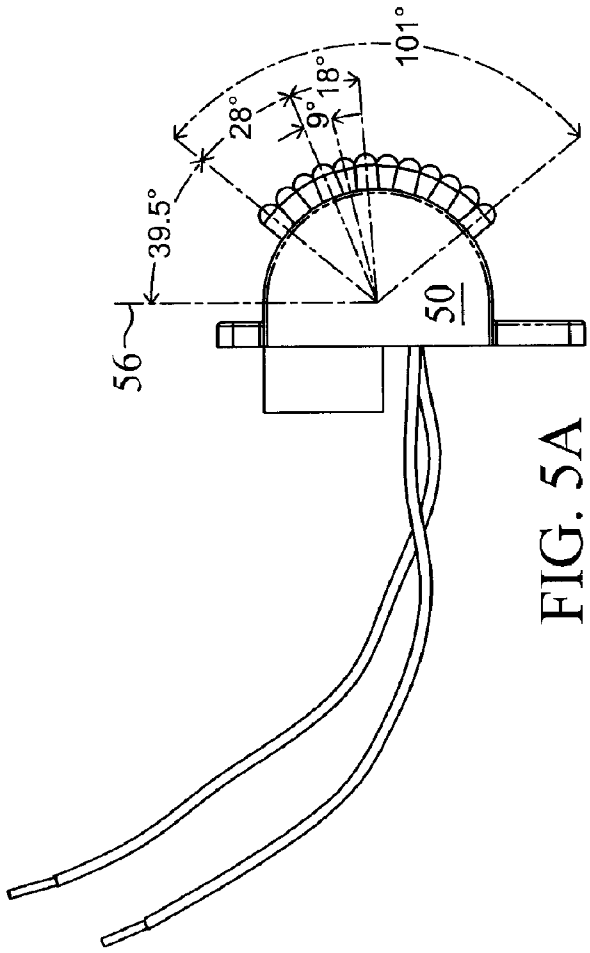
FIG. 5A is a top view and schematic representation of a portion of the LED module of the instant invention, illustrating the angular relationship of the matrix array.

FIG. 5A illustrates a top view of the starboard module and LED assembly, and the angular displacement of the LED matrix. Taken from a forward reference axis 56 in a horizontal plane, the first LED is placed 39.50° to the starboard side. The adjacent LEDs in each individual row are placed 18° from one another. Further, the respective horizontal rows of LEDs are vertically offset 9° to complete the light field.

To comply with the governing regulations, the instant invention can provide a 101° angular placement of the LEDs, with a wider field of vision.

Figure 5B:
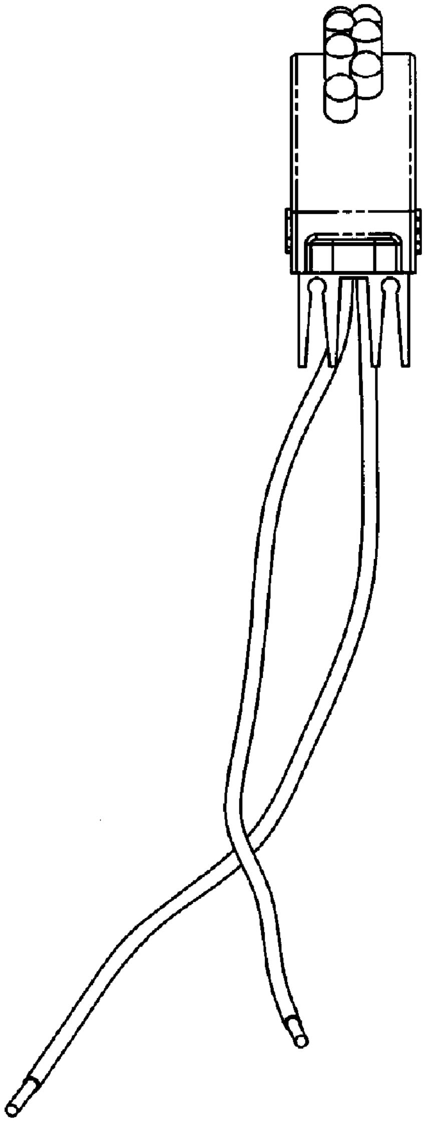
FIG. 5B is a side plan view of the device shown in FIG. 5A.
Figure 5C:
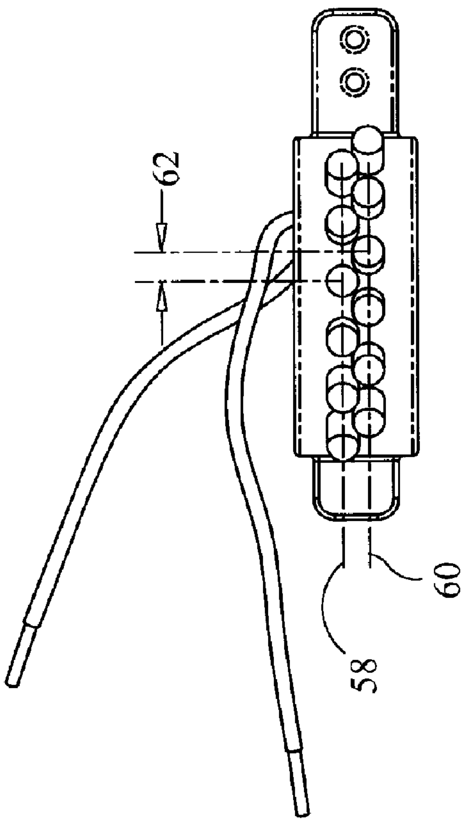
FIG. 5C is a front plan view for the device shown in FIG. 5B.

FIG. 5B is a side view of the LED module shown in FIG. 5A, and FIG. 5C is a front plan view thereof. FIGS. 5B and 5C further illustrate the LED matrix array, and the generally horizontal rows 58 and 60. The vertical offset 62 defines the placement of juxtaposed rows.

The LED module incorporates numerous LEDs, each of which has conventional leads for electrical connection to a power source. The leads can be directly connected to a typical power bus for DC voltage or a regulator, or alternatively can be electrically connected to a printed circuit board, electronic components, conductive lines, metallic strips within a mounting board, or similar means which are a matter of design choice to one of ordinary skill in the industry.

The module which constitutes the light source will include at least one row of LEDs about the curved surface of the mounting block. In a preferred embodiment, a plurality of LED rows in the matrix array with the illustrated angular displacement conforms to the U.S. Coast Guards regulations for field of vision, light propagation, and beam spread sectors.

The shape of the arcuate module also complements the lens geometry and cut-off surfaces, to mask light fields, and thereby provide required clarity and required vision fields and distances.

Figure 6:
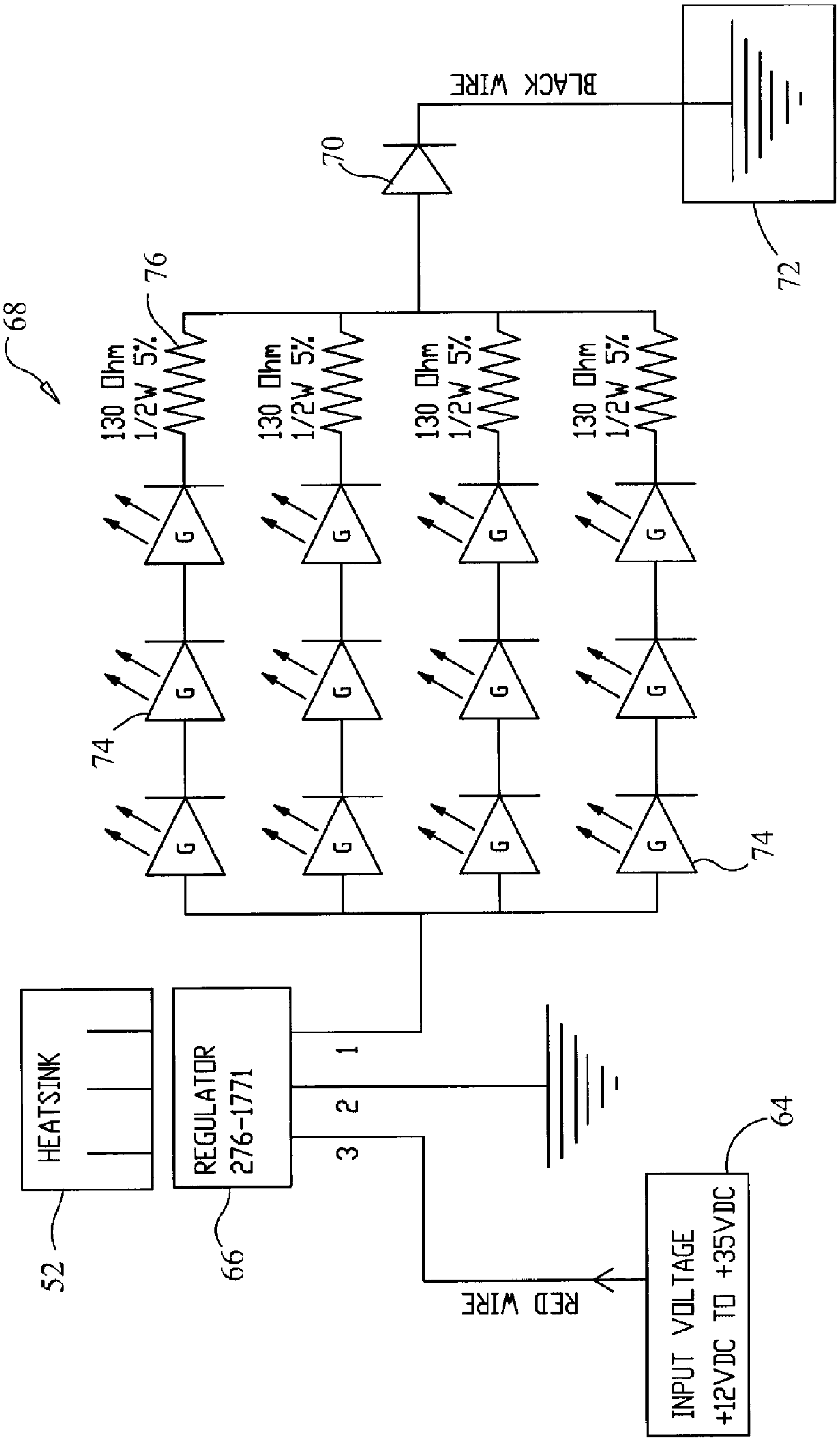
FIG. 6 is a schematic representation of the electronic circuit utilized in the instant invention.

FIG. 6 is the preferred schematic representation of the electronic circuit utilized in the instant invention. Input voltage source 64 provides DC voltage, preferably in the range of 12 volts DC to 35 volts DC. A voltage regulator receives the input voltage and provides a constant voltage output from the regulator to the LED circuit 68. Circuit 68 includes, in one embodiment, four (4) parallel lines of LED and resistor components, each line connected to a common voltage node which receives the output of voltage regulator 66 at one end, and through a common node and diode to ground 72 at the other end. Each parallel line of the matrix array contains three (3) LEDs 74 in series with a control resistor 76.

By way of example only, heat sink 52 can be a 5 watt rating for TO-220 case power devices; voltage regulator 52 rated for 35 volts DC, TO-220 case, Type 7812 is satisfactory.

The physical mounting of the twelve (12) LEDs depicted in FIG. 6, correspond to the two (2) horizontal rows shown in FIG. 4, each row having six (6) LEDs. LED circuit 68 and related micro-electronic components described herein can be mounted on or within a printed circuit board, the circuit board being manufactured or molded within mounting block 50.

Figure 7C:
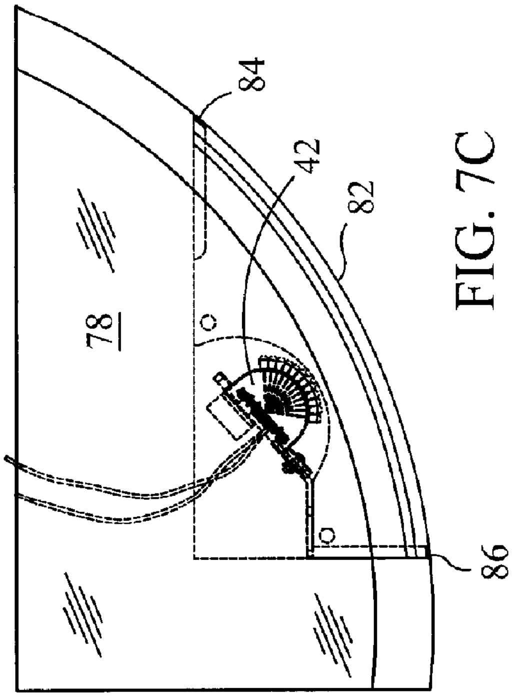
FIG. 7C is a top view and diagrammatic representation of the apparatus shown in FIG. 7B once installation is complete.
Figure 7A:
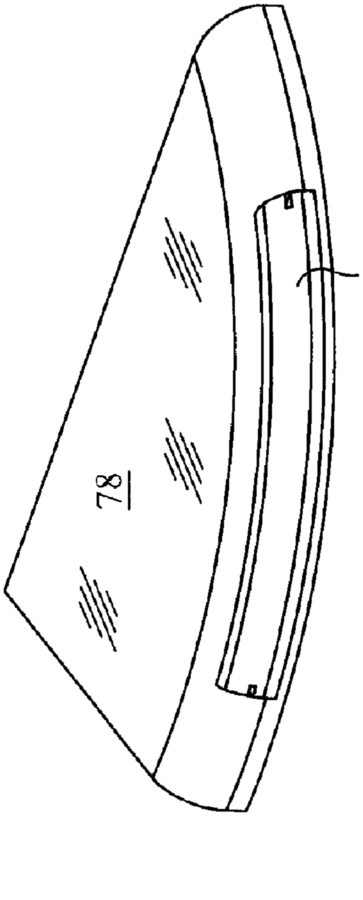
FIG. 7A is a sectional perspective view of the hardtop and recessed void of the instant invention.

Referring to FIG. 7A, a sectional, partial cut-away and perspective view of the hardtop 78 and recessed void 80 are shown. The hardtop is manufactured using conventional techniques and materials. Hardtops are typically produced using fiberglass technology and molding processes utilizing reinforced plastic or composite materials. The top or platforms of the instant invention includes an inner foam, balsa or hex cell foam. The tops can be of any shape, but are generally rectangular with opposite forward (bow) or rear (stern) corners. The forward corners or edges of this system include recessed voids 80 on each side of the vessel to accommodate the starboard and port navigation light modules. The recessed voids 80 are cavities produced in the molding process, and are dimensioned to accept the LED module assemblies.

Figure 7B:
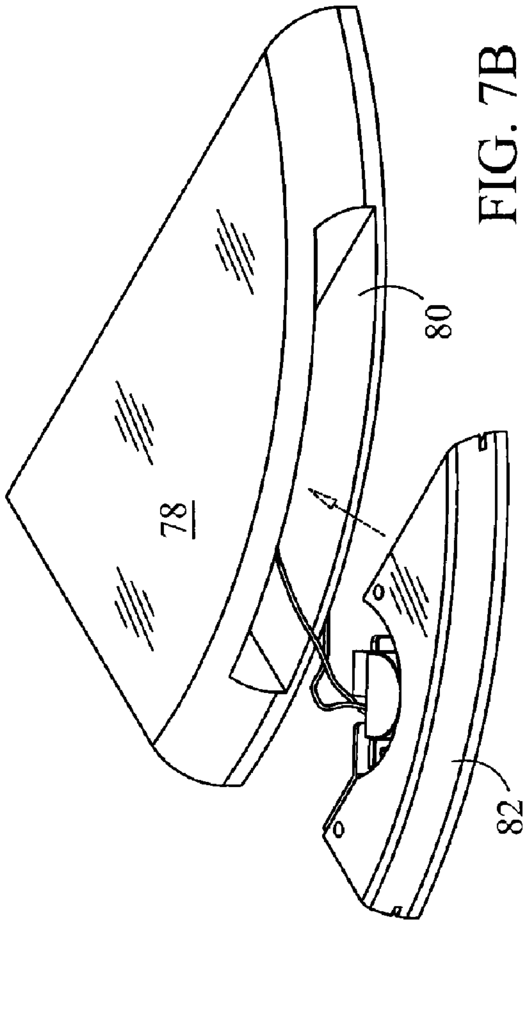
FIG. 7B is a perspective view of the primary components of the instant invention, illustrating the LED Module and Lens assembly, prior to insertion within the complementary hardtop cavity.

With reference to FIG. 7B, a perspective view of the primary components of the instant invention are shown, illustrating the LED Module and Lens assembly 82, prior to insertion within the complementary hardtop recessed void 80.

FIG. 7C is a top view and diagrammatic representation of the navigation light shown in FIG. 7B once installation is complete. The complete LED Module and Lens assembly 82 is contained within hardtop 78. Cut-off surfaces 84 and 86 are opaque and provide a complete impediment to light transmission, therefore masking off the light spread sectors. As the device shown in FIGS. 7A through 7C is the starboard (green) light, it is appreciated the lens assembly provides the transition from the front of the vessel to the starboard side. Therefore the visible light in dark or night conditions would be apparent to an observer only in the available angular fields of view determined by the geometry of the device shown, and the location of the observer.

The port side navigation light source, comprising red light, is generally of the same structural and functional design as the navigation lights shown and described in FIGS. 1 through 7C. The port light fixture is a mirror image of the starboard light fixture light, but utilizes red LEDs. However for red light, LEDs of the appropriate wavelength, chromaticity and luminous intensity are required. These LEDs would be used within the circuit shown in FIG. 6, along with control resistor having a suitable rating for the port light circuitry.

Figure 8B:
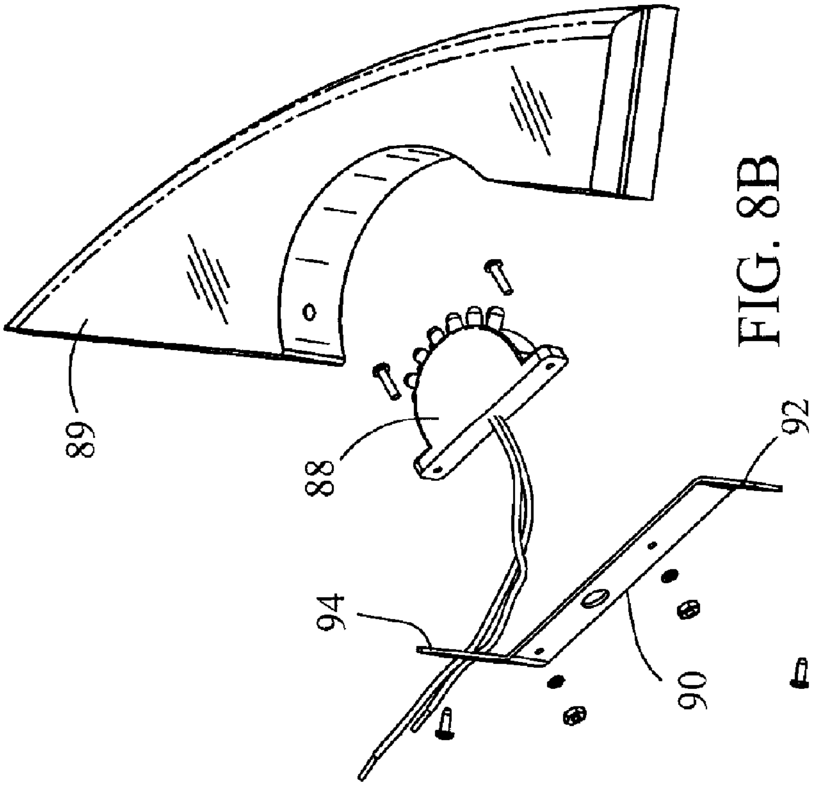
FIG. 8B is an alternative embodiment of an exploded view of the device shown in FIG. 3C.
Figure 8A:
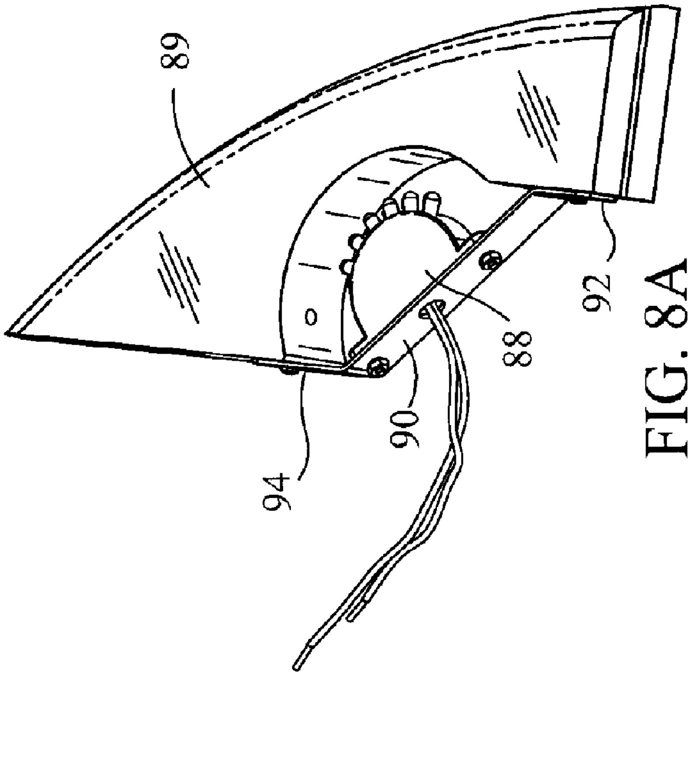
FIG. 8A is an alternative embodiment of an perspective view of the device shown in FIG. 3A.

FIG. 8A is an alternative embodiment of a perspective view of the navigation light shown in FIG. 3A. FIG. 8B is an exploded view showing the components of the device shown in FIG. 8A. Mounting block 88 is secured to lens 89 by mounting bracket 90. In this design, mounting bracket 90 has two flanged ends 92 and 94 to secure the unit to lens 89. Also note in this embodiment a heat sink has been eliminated.

Figure 9A:
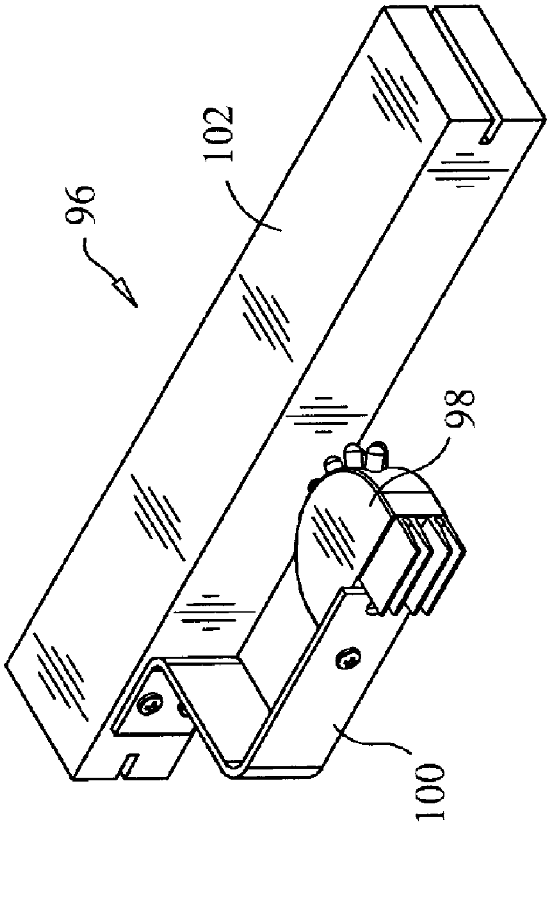
FIG. 9A is a perspective view of an embodiment of the stern light novel lens and LED module components of the instant invention.

FIG. 9A is a perspective view of an embodiment of the stern light novel lens 96.

Figure 9B:
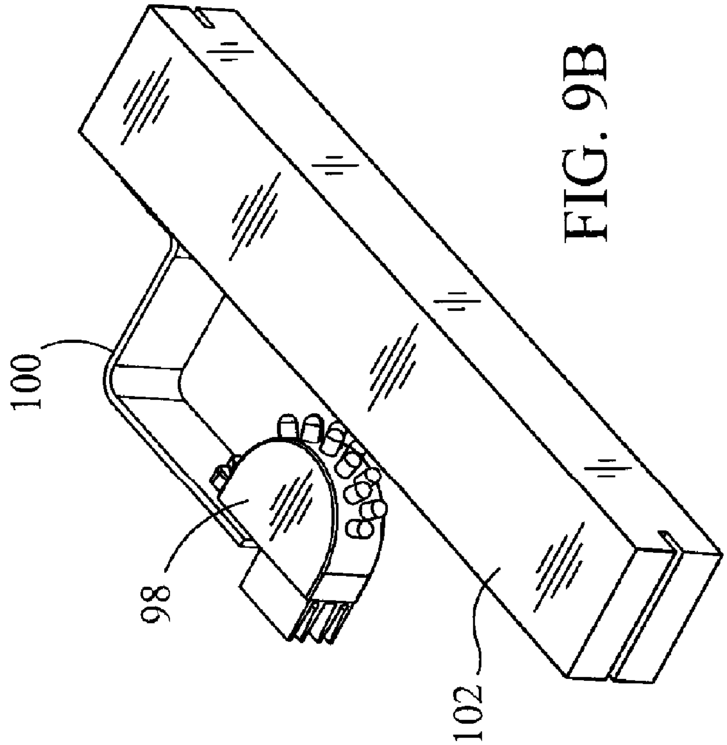
FIG. 9B is an alternative perspective view of the apparatus illustrated in FIG. 9A.
Figure 9C:
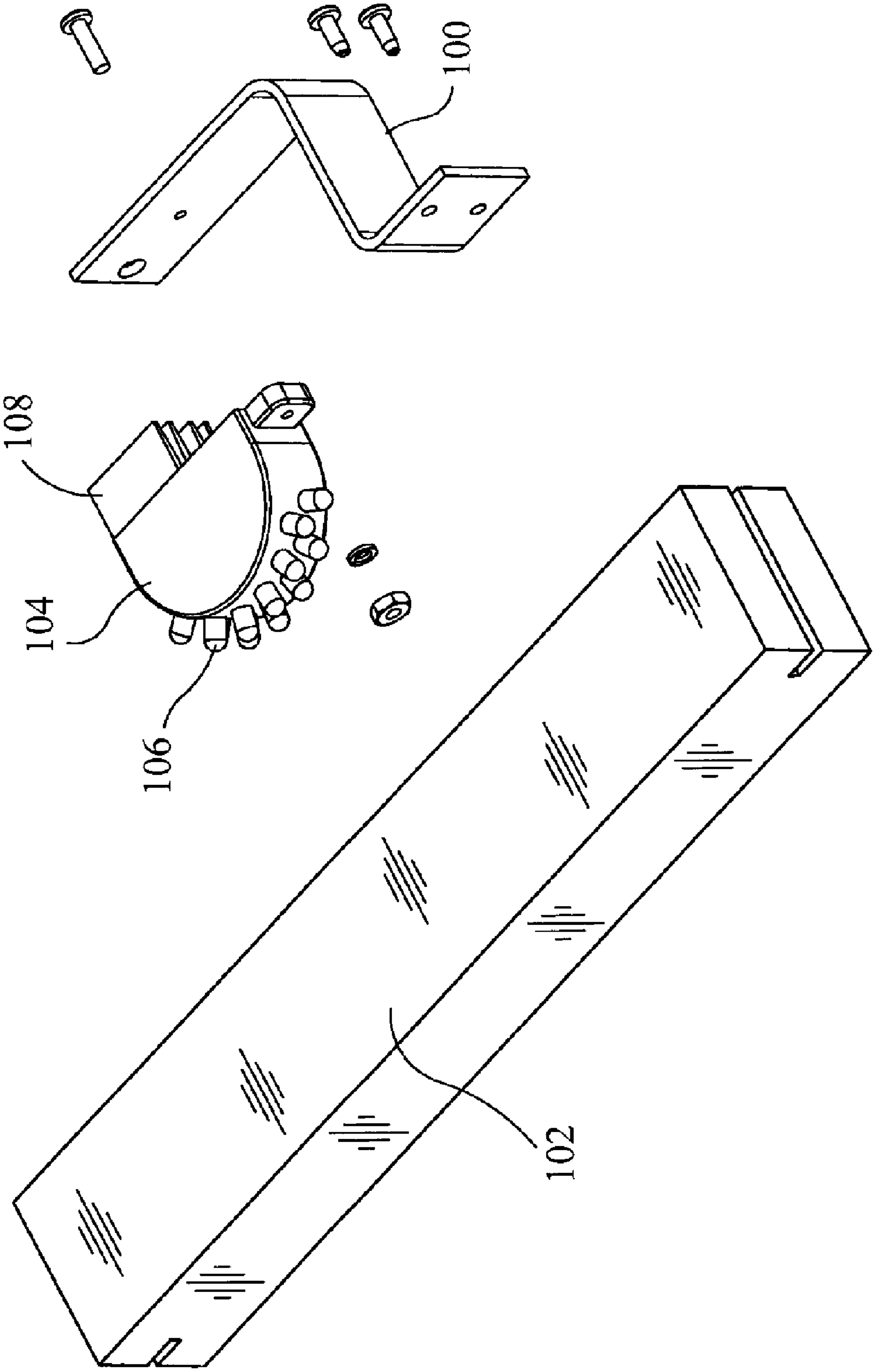
FIG. 9C is an exploded perspective view of the apparatus shown in FIG. 9A, illustrating the components prior to assembly.

FIG. 9B is an alternative perspective view of the stern light assembly 96 illustrated in FIG. 9A, and FIG. 9C shows an exploded perspective view of the components of the stern light prior to assembly.

The Stern light unit includes LED module 98, mounting bracket 100 and lens 102. The LED module 98 is of a similar design to that of the starboard and port light assemblies described herein, and includes mounting block 104, and a plurality of LEDs 106. Of course as this is a stern light, the LEDs are white.

The stern light lens 102 is a generally rectangular block, and does have a curved forward surface or a concave back. This is because the stern light is placed in the center of the boat's hardtop or desired platform, and is facing directly rearwardly. As such, transition surfaces from the sides of the hardtop are not required, and the stern light in flush with the straight backward surface of the hardtop. The hardtop is molded with a corresponding rectangular recessed void to accept the stern light modular assembly.

In alternative embodiments for the port and starboard light units, white LEDs of sufficient specifications could be utilized in the designs taught herein, along with colored translucent lenses which would provide the necessary red and green lights.

The instant lighting system has successfully completed certification requirements promulgated by the United States Coast Guard for boats exceeding 50 meters in length. These standards mandate operational performance for observer distances to 3 nautical miles. The testing sequence includes the inspection and functional operation of the hardware and electrical components, chromaticity tests, luminous intensity tests, vertical and horizontal cut-off angle verifications, and watertightness tests. The novel system was superior in all categories of light emissions from the lens assembly, photometric requirements and integrity of the housings.

The various components of the instant invention can be manufactured utilizing high grade electronic components, polycarbonates, and the LEDs described above. The design inherently withstands degradation from marine conditions, UV light, salt water exposure and corrosion and the like, because of the stealth features which hide and protect all parts within the hardtop. Only the lens is exposed, however the lens is not susceptible to such damage because of its extremely durable and rigid composition.

The term hardtop as used herein refers to a vessels common top, however it is equally application to any type of platform or support structure. For example, the light fixtures shown in the figures could be readily adapted in a vertical support, arm, beam, leg, cabinet wall for surface. It is only necessary to adapt the geometry of the lens to be flush with the immediately adjacent surface, and fit within a corresponding recess.

It will be seen that the objects set forth above, and those made apparent from the foregoing description, are efficiently attained and certain changes may be made in the engineering design and construction, without departing from the scope of the invention. It is intended that the foregoing description, examples, and designs showing the accompanying drawings shall be interpreted as illustrative, and not in a limiting sense.

The instant invention has been shown and described herein in what is considered to be the most practical and preferred embodiment, and alternative embodiments thereof. It is recognized, however, that departures may be made therefrom within the scope of the invention and that obvious modifications will occur to persons of ordinary skill in the art.

What is claimed is:

1. An integrated marine vessel hardtop and navigation lighting system, for use on a vessel having an elevated hardtop covering the helm, bridge, cockpit, bow, deck or similar areas, comprising:

hardtop means for covering a portion of said vessel;

integral lighting means for providing navigation lights;

said integral lighting means including a lens, said lens being of a translucent material allowing for substantially unimpeded light transmission;

said integral lighting means further comprising an LED module having an arcuate mounting member, said mounting member including an outwardly facing curved surface;

a plurality of LEDs secured to said mounting member about said curved surface;

said lens including a generally arcuate void corresponding to, and complementing, said LED module curved surface; and attaching means for securing said LED module to said lens;

said hardtop means including means for receiving said integral lighting means, said integral lighting means being secured and self contained within said hardtop means and coterminous therewith;

whereby, said hardtop means and said integral lighting means constitute a generally unitary assembly, said integral lighting means being integrated within said hardtop means in an unobtrusive manner without protuberances.

2. The apparatus of claim 1, wherein said hardtop means constitutes a generally rectangular configuration having a bow facing front, a starboard side, and a port side;

said hardtop means further having transition sections from said front to each of said sides;

said receiving means constituting recessed voids incorporated within each of said transition sections for securing and housing said integral lighting means; and said integral lighting means including a starboard module and a port module.

3. The apparatus of claim 1 wherein said plurality of LEDs comprise a matrix array mounted about said LED module's outwardly facing curved surface.

4. The apparatus of claim 3, wherein said lens has an irregular geometry comprising a curved transitional front surface and two sides having axes generally perpendicular to one another;

said lens arcuate void further including a back generally concave surface complementing said LED module's curved surface.

5. The apparatus of claim 4 wherein said two sides of said lens constitute cut-off surfaces, masking LED light fields in compliance with Coast Guard regulations.

6. The apparatus of claim 1, wherein said hardtop means further includes a stern facing back;

said receiving means further constituting a recessed void incorporated within said hardtop back for securing and housing said lighting means; and said integral lighting means including a stern module.

7. The apparatus of claim 6, wherein said stern module further comprises:

a lens, said lens being of a translucent material allowing for substantially unimpeded light transmission;

an LED module having an arcuate mounting member, said mounting member including an outwardly facing curved surface;

a plurality of LEDs secured to said mounting member about said curved surface;

and attaching means for securing said LED module to said lens.

8. The apparatus of claim 7, wherein said plurality of LEDs comprise a matrix array mounted about said LED module's outwardly facing curved surface.

* * * * *